Feb. 4, 1958

J. D. ALSMAN ET AL 2,821,873

CONTOURING TOOL

Filed April 30, 1953

INVENTORS.
JAMES D. ALSMAN
HARRY A. MEYER
BY

*Andrew K. Toneda*

THEIR ATTORNEY

INVENTORS.
JAMES D. ALSMAN
HARRY A. MEYER
BY
THEIR ATTORNEY

United States Patent Office 2,821,873
Patented Feb. 4, 1958

2,821,873

CONTOURING TOOL

James D. Alsman and Harry A. Meyer, Detroit, Mich., assignors, by mesne assignments, to American Radiator & Standard Sanitary Corporation, New York, N. Y., a corporation of Delaware Application April 30, 1953, Serial No. 352,177

1 Claim. (Cl. 77—58)

This invention relates to a new and useful cutting tool assembly to be used in milling and shaping contoured bodies.

One object of this invention is to provide a cutting tool assembly having a plurality of cutting members so spaced relative to each other that each member will cut equal surface areas of the contoured surface.

Another object is to provide a tool assembly in which the cutting members wear at the same rate and require sharpening at the same time.

Another object is to provide a cutting tool assembly used in combination with a boring mill whereby the horizontal movement of the turret head will rotate the cutting tool holder about the transverse axis of the ram head.

Other objects of the invention will become apparent from the following description, the drawings to which it relates, and the claim hereinafter set forth.

This invention comprises the new and improved construction and combinations of parts and their operating relation to each other which will be more fully described hereinafter, and the novelty of which will be particularly pointed out and distinctly claimed.

In the accompanying drawings, to be taken as part of the specification, there is fully and clearly illustrated a preferred embodiment of the invention, in which drawings.

Figure 1:
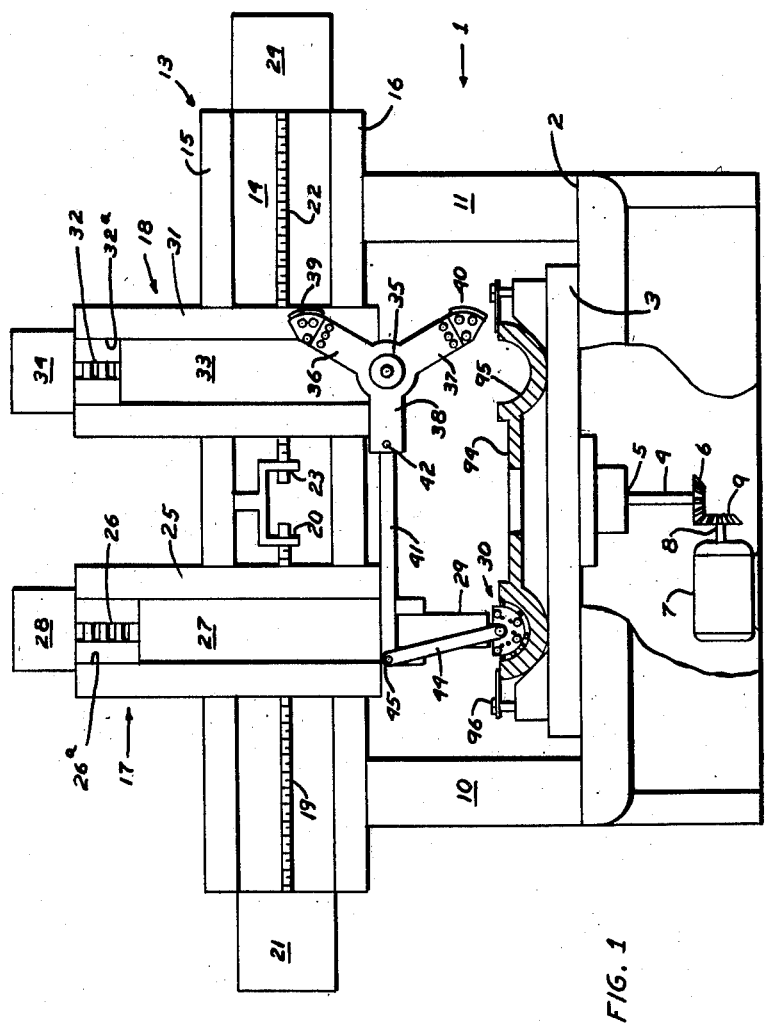
Figure 1 is a more or less diagrammatic view in elevation of a two holder boring mill with the cutting tool assembly operatively secured thereto.

Referring to the drawings by numerals of reference, and more particularly to Fig. 1, there is shown a boring mill 1 having a platform 2. A rotatable work supporting table 3 is supported by the platform 2. The table 3 is preferably circular in shape and is so supported by the platform 2 that it is freely rotatable thereon. A shaft 4 has one end secured to the table 3 at a connection bearing 5. The other end of shaft 4 is connected to a gear 6. An electric motor 7 has a shaft 8 connected to a gear 9. The gears 6 and 9 are so arranged that energization of motor 7 will cause gear 9 to rotate, which in turn will rotate gear 6. The rotative motion imparted to gear 6 will be transmitted to the table 3 through the shaft 4. A casting 94 circular in shape having a semi-circular trough 95 is shown in section on the rotatable work supporting table 3. The casting 94 is held in position on the rotatable work supporting surface 3 by means of a holding fixture 96. The casting 94 has a semi-circular trough 95 which is to be milled and shaped. To clearly explain this invention, the trough 95 is divided into a plurality of abutting surface portions each defined by a spiral track of abutting turns. This division of the trough 95 will be described in greater detail in the remainder of this specification.

The boring mill 1 has two upright members 10 and 11 which support a cross-member 13. The cross-member 13 is channel-shaped having a back portion 14 and two outwardly extending flanges 15 and 16. The flanges 15 and 16 serve as guide rails for the ram head assembly 17 and the turret head assembly 18. A screw threaded shaft 19 is loosely held in position at one end by a journal member 20 and is connected at its other end to a driving motor diagrammatically shown as 21. The screw threaded shaft 19 is operatively connected to the ram head assembly 17 so that the rotation of the shaft 19 will move the ram head assembly 17 horizontally along the guide rails 15 and 16.

The ram head assembly 17 consists of a vertical guide member 25 that is supported by rails 15 and 16 and is capable of moving in a horizontal direction when screw threaded shaft 19 is rotated. The vertical guide member 25 has a guide portion 26ª supporting a supporting member 27. There is a geared actuating member 26 on the guide member 25 which cooperates with the supporting member 27 to move the same toward and away from the rotatable work supporting surface 3. An electric motor shown diagrammatically as 28 is so arranged that it controls the vertical movement of the supporting member 27 by the member 26. Rigidly secured to the lower end of the supporting member 27 is a ram head 29. Ram head 29 will move in a vertical direction with the supporting member 27 and in a horizontal direction with the guide member 25. Rotatably connected to the ram head 29 is the tool head assembly 30 which will be described in detail in connection with Figs. 2 and 3.

Similarly the turret head assembly 18 consists of a guide member 31 that is supported by rails 15 and 16 and is capable of moving in a horizontal direction when screw threaded shaft 22 is rotated. The guide member 31 has a guide portion 32ª supporting a supporting member 33. There is a geared actuating member 32 on the guide member 31 which cooperates with the supporting member 33 to move the same toward and away from the rotatable work supporting surface 3. An electric motor shown diagrammatically as 34 is to arranged that it controls the vertical movement of the supporting member 33 by the member 32. Rotatably attached to the lower end of the member 33 is the turret head 35. Turret head 35 has three arms 36, 37, and 38. Connected to arm 36 there is a left hand shaping tool 39. Connected to arm 37 there is a right hand shaping tool 40. A connecting arm 41 is pivotally connected at one end to arm 38 as at 42 and at the other end to a lever 44 as at 45.

Figure 2:
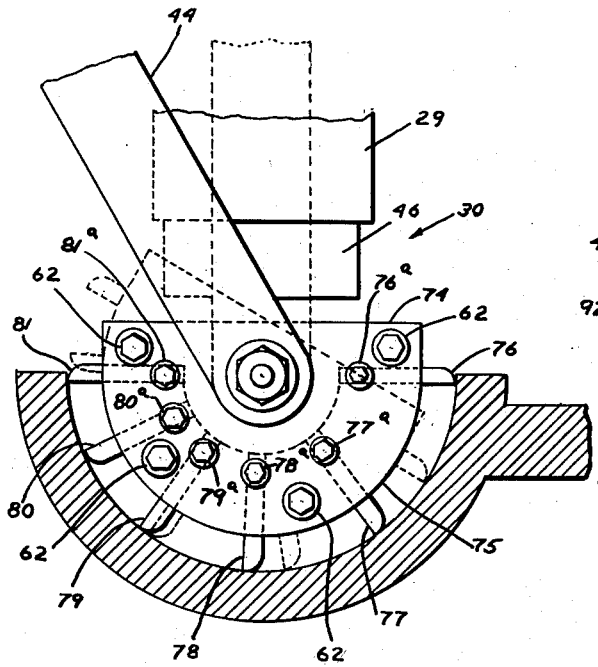
Fig. 2 is a detail view in elevation of the cutting tool assembly.
Figure 3:
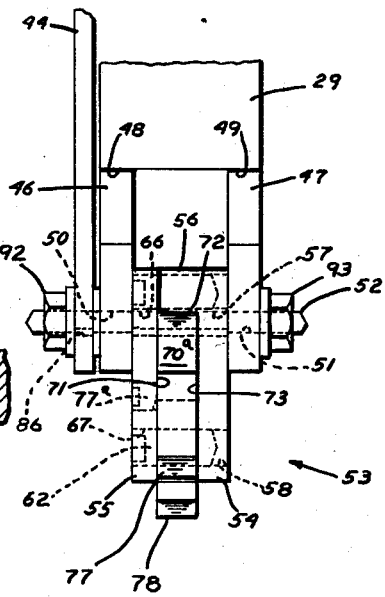
Fig. 3 is a detail side view of the cutting tool assembly.

Referring to Figs. 2 and 3, the cutting tool assembly 30 has bearing members 46 and 47 rigidly connected to ram head 29 at 48 and 49 by means of bolts or other suitable means. The bearing members have apertures 50 and 51 for the passage of retaining shaft 52 therethrough. The tool holder 53 has a body member 54 and a plate member 55. The body member 54 has a flanged portion 56. The body member has an aperture 57 for the passage of retaining shaft 52. The body member has a plurality of apertures 58 threaded to receive tightening "Allen" bolts 62. The plate member 55 has an aperture 66 for the passage of shaft 52. The plate member 55 has aperture 67 aligned with apertures 58 to receive tighting bolts 62.

The tool holder 53 is formed by plate 55 being positioned over the body member 54 so that the upper end of the plate member 55 is positioned over the flanged portion 56 of the body member 54. A slotted portion 70ª is defined in the tool holder 53 by wall 71 of the plate member 55, flange wall 72 and wall 73 of the body member 54.

The tool holder 53 has a flat upper wall 74 and a semi-circular side wall 75. The cutting tools 76, 77, 78, 79, 80, and 81 are inserted in the slot 70ª of the tool holder 53. The cutting tools 76, 77, 78, 79, 80, and 81 are spaced at a predetermined distance from each other with their cutting edges extending away from the central axis of the tool holder 53 defined by shaft 52. Thus the outer ends of cutting tools 76, 77, 78, 79, 80, and 81 define a semi-circle parallel to the semi-circular side wall 75 of the tool holder 53. Bolts 62 are inserted into apertures 67 of plate member 55, pass through the slot portion 70ª, and are threaded into the threaded apertures 58 of the body member 54. The bolt members 62 exert a pressure on plate member 55 against body member 54 to form a rigid tool holding assembly. The plate member 55 is also provided with threaded apertures in which there are positioned tightening bolts 76ª, 77ª, 78ª, 79ª, 80ª, and 81ª cooperable with the cutting tools 76—81 respectively. The shaft 52 is so constructed that a tight non-rotative connection is maintained with the tool holder 53. This connection permits the tool holder 53 to rotate with shaft 52 about the transverse axis of the ram head 29. Lever member 44 has an aperture 86 provided for the passage of shaft 52 therethrough. The shaft 52 is also rigidly and non-rotatively secured to lever member 44. Thus when lever 44 is moved the shaft 52 will rotate, which in turn will rotate the tool holder 53. The shaft 52 may be connected to the tool holder 53 and the lever 44 by means of a key or other conventional means that will prevent rotation of a shaft in a circular aperture. The ends of shaft 52 are threaded to receive nuts 92 and 93 which maintain shaft 52 in position.

Figure 4:
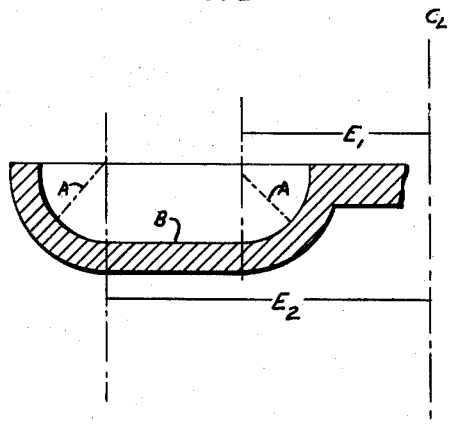
Fig. 4 is a sectional view of a casting with a variation of the contoured surface to be milled.
Figure 5:
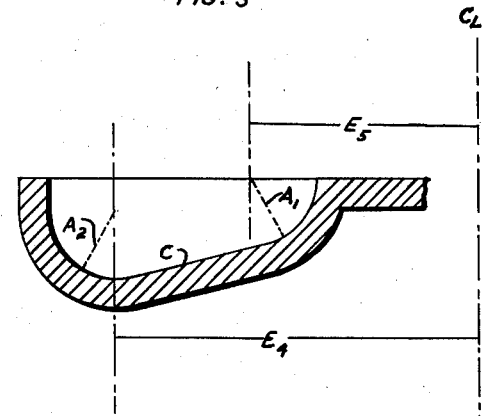
Fig. 5 is a sectional view of a casting showing another variation of the contoured surface to be milled.

Figs. 4 and 5 show other variations of the type of contour sections that may be finished and shaped using the above disclosed tool. The letter A signifies the radius from the center of the cutting tool holder 53 to the outer end of the cutting tools. The letter B signifies a radius from the center line of the work supporting table 3 to the center of the semi-circle formed by the tool holder. It should also be noted that although the contour sections are not semi-circular troughs the surface area to be cut is again defined as comprising a plurality of abutting surface portions each defined by a spiral track of abutting turns.

*Operation*

In operation this form of invention functions generally as follows: The cutting tools 76, 77, 78, 79, 80, and 81 are inserted in slot 70ª of the tool holder 53. The cutting tools are spaced at predetermined distances from each other so that each tool will cut an equal lineal surface of the semi-circular trough 95. The bolts 76ª—81ª are tightened to hold the cutting tools in place within the slot 70ª. The tool holder 53 is inserted between the bearing members 46 and 47. The lever 44 is positioned so that its aperture 86 will be aligned with aperture 50 of the bearing member 46. The shaft 52 is inserted into the apertures of the various members provided therefor.

In this arrangement movement of the lever 44 will rotate the shaft 52 about the transverse axis of the ram head 29. The shaft 52 will in turn rotate the tool holder 53 about the transverse axis of the ram head 29. The above described assembly is defined in the specification as the tool assembly 30. The tool assembly 30 is held in position on the ram head 29 by the shaft 52 passing through the apertures 50 and 51 in the bearing members 46 and 47.

The work supporting table 3 is rotated by the electric motor 7. The casting 94 is held in position on the work supporting table 3 by means of the holding fixtures 96. The casting 94 will rotate with the work supporting table 3. As the casting 94 is being rotated, the guide member 25 of the ram head assembly 17 is moved in a horizontal direction until the tool head assembly 30 is directly over the semi-circular trough 95. The guide member 31 of the turret head assembly 18 is moved in a horizontal direction to rotate the tool holder 53 until the cutting tools 76 and 81 are parallel with the plane of the work supporting table 3. The positioning of the cutting tools 76 and 81 is accomplished by means of the lever arrangement 44 and 41 connecting the turret head assembly 18 with the tool holder 53. Simultaneous with the movement of the guide member 31 of the turret head assembly 18, the supporting member 27 of the ram head assembly 17 is actuated to move the ram head 29 so that the cutting tools will be at the desired depth in the semi-circular trough 95 of the casting 94. The adjustments of both the ram head assembly 17 and the turret head assembly 18 are so coordinated that the cutting tools reach the desired depth in the trough 95 when the cutting tools 76 and 81 are parallel with the plane of the work supporting table 3.

When the cutting tools are in position and the cutting operation begins, the guide member 31 of the turret head assembly 18 is moved in a horizontal direction away from the axis of rotation of the work supporting table 3. This movement of the guide member 31 will rotate the tool holder 52 about the transverse axis of the ram head 29 in a clockwise direction. The movement of the guide member 31 is limited so that the tool holder 52 will rotate a predetermined distance and permit each cutting tool to cut an equal surface area of the circular trough. As the circular trough 95 rotates, the cutting tools cut spiral tracks on the inner surface of the trough 95. These spiral tracks are equal in length to each other and have equal surface areas. After the cutting tools have been rotated through the predetermined distance and cut equal surface areas of the trough 95, the tool head assembly is moved out of cutting position and the lever member 41 is disconnected and removed, thus permitting the turret head 35 to rotate about its transverse axis.

The semi-circular trough 95 is finished by the use of the form tools 39 and 40. The turret head 35 is rotated until finishing tool 39 is in position above the circular trough 95. The turret head guide 31 is so adjusted that finishing tool is directly over the semi-circular trough 95. The turret head vertical adjusting member 33 is moved to lower the finishing tool 39 into the trough 95 a predetermined distance. Thus by rotation of the casting 94 the left hand side of the trough 95 is finished. The same operation is repeated for the right hand finishing tool. It should be noted that it is not necessary to rotate the finishing tools in the same manner as the cutting tools due to the size and shape of the tools and the type of operation performed. The heretofore described operation of milling and finishing of cast contoured structures insures a uniform section which is necessary for certain types of castings that are to be used as fan rotors, fluid drive impellers, or the like.

In the form of invention shown in the drawings, five cutting tools are used in the cutting operation. Since the surface area to be cut and shaped is semi-circular in form the cutting tools are arranged in a semi-circle having a tool holder of the same shape. It should be noted that this shape of tool holder and arrangement of cutting tools is not to be understood as a limitation to this shape, but only as a specific example used to explain the operation of the invention. Cutting tool 76 is used as an index tool and is located on a plane parallel to the horizontal plane of the work supporting table 3. Cutting tool 77 is spaced at an angle of 51° from cutting tool 76. The angle is defined as being the angle between the radius formed by cutting tool 76 and the center of the tool holder 53 defined by the center of shaft 52 and a similar radius formed by the cutting tool 77 and the center of tool holder 53. Cutting tool 78 is spaced at an angle of 42° from the cutting tool 77. Cutting tool 79 is spaced at an angle of 33° from the cutting tool 78. Cutting tool 80 is spaced at an angle of 28° from cutting tool 79. Cutting tool 81 is spaced at an angle of 26° from cutting tool 80. The distances between the tools is stated in degrees for convenience. The distance between the cutting tools could also be stated as the distance along the circumference of a circle formed by the ends of the tools. In fact, in calculating the angular distance between the tools, the circumferential distance is used to determine the angles between the tools.

To explain the cutting operation of the various tools, the semicircular trough 95 of the casting 94 will be divided in degrees with the point of contact of tool 76 being 0° and the point of contact of tool 81 being 180°. When the tool head is rotated through the predetermined angle of 51°, the tool 76 will cut the lineal distance between 0° and 51° on the curved surface of the trough 95. The lineal distance between 0° and 51° may also be defined as a surface area divided into spiral tracks of abutting turns having a precalculated length. When the tool head 53 is rotated the stated 51°, the cutting tool 77 will cut a surface of 42° beginning with 51° and ending at 93° on the surface of the trough 95. The lineal distance between 51° and 93° may also be defined as a surface area divided into spiral tracks of abutting turns having a predetermined length. The length of the spiral track between 0° and 51° is equal to the length of the spiral track between 51° and 93°. The remaining 9° of rotation of the cutting tool 77 will be over a surface that has already been cut by the cutting tool 78. This is so because cutting tool 78 is positioned at a point corresponding to 93° on the surface of the trough 95 at the beginning of the cutting operation and moves in a clockwise direction from that point. Thus the lineal distance corresponding to the angular distance of 93° and 102° on the surface of the curved trough 95 is cut by tool 78 and the tool 77 passes over this distance without cutting. Similarly, the tool 78 will cut for a distance corresponding to 33° on the curved surface of the trough 95. Tool 78 will begin its cut at a point corresponding to 93° and continue its cut to a point corresponding to 126°. The lineal distance between 93° and 126° may also be defined as a surface area divided into spiral tracks of abutting turns on the surface of the trough 95. The spiral track defined from 93° to 126° is equal in length to the heretofore described spiral tracks. The remaining 18° of travel of the tool 78 is over a surface that has already been cut by tool 79. Tool 79 begins to cut at a point corresponding to 126° on the curved surface of trough 95 and continues to cut for a distance corresponding to 28°. The remaining travel of 23° by tool 79 is over a surface that has already been cut by tool 80. Similarly, the tool 80 begins to cut at a point corresponding to 154° and continues to cut to the end of the semi-circle of the trough corresponding to 180°. The remaining travel of 25° is beyond the circular trough 95. The lineal surface between 126° and 154° may also be defined as a surface area divided into spiral tracks of abutting turns having a lineal distance equal to the lineal distance of the heretofore described spiral tracks. Also, the surface between 154° and 180° on the surface of the trough 95 may be defined as a surface area divided into spiral tracks of abutting turns having its length equal to the length of the heretofore described spiral tracks.

It should be noted by the above stated arrangement that the surface area of the curved trough 95 is divided into five equal parts and the tools are so spaced relative to each other that each tool will cut equal surface areas. It is necessary that the ends of the cutting tools be equi-distant from the center of the tool holder so that each tool will cut to the same depth in the metal; otherwise, if unequal, one tool may cut more area than the other tools due to a cut of insufficient depth by the other tools. It is obvious that an annulus of different radius and/or different cross-section than that shown herein may require different angular spacing of the tools to cut equal surface areas. The calculation of each spacing is a simple one.

From the foregoing description of operation, it will be seen that each cutting tool cuts an equal surface area and will require sharpening at substantially the same time.

It should be noted that cutting tool 81 does not take part in the cutting operation and is used for cutting operations not involving the other tools.

Although in the arrangement shown in Figs. 1 to 3 a semi-circular trough 95 has been used as an example of the type of curved surface that may be cut and shaped by this tool assembly, other compound curved and flat surfaces may be cut in a similar manner by dividing compound curves into component circular portions and setting the tools for the type of cut required for each portion and spacing them in their tool holder to cut equal surface areas. The term compound curve includes curved surfaces of varying degrees of curvature and combinations of curved and flat surfaces. Figs. 4 and 5 show some other types of curved surfaces that may also be cut and shaped using this type of arrangement. In Fig. 4 there is shown an annular cut in which the inner and outer portions of the cut are circular, of radius A, and have their centers located at different radii, $E_1$ and $E_2$, from the axis of rotation of the work table. There is a flat wall portion B connecting the outer and inner curved portions. To cut this shape the tools would be given their predetermined spacing as determined by radii $E_1$ and A. After making the inner cut at radius $E_1$, the tool holder is moved out to radius $E_2$ and the tools are given a different predetermined spacing as is required for that setting. After the cut at $E_2$ is made the tool can be rotated 90° and tool 81 used to cut the flat surface B.

When the tool is used to cut at different radial distances from the axis of rotation of the work table the identical angular setting of the tools can be used if the radius of the cut is increased proportionately to the distance from the axis of rotation. Thus, in Fig. 5 the same angular setting of the tools can be used at $E_4$ and $E_5$ if the ratio $A_1:E_5$ equals $A_2:E_4$, $A_1$ and $A_2$ being the inner and outer radii of the cut and $E_5$ and $E_4$ being the radii from the axis of rotation of the work table. In Fig. 5, the inner cut would be made with a predetermined angular setting of the cutting tools and a cutting radius $A_1$. The tools would then be moved from radius $E_5$ to $E_4$ and would be set for a cutting radius $A_2$ and maintained at the same angular setting. After the second cut is made the flat sloping wall portion C would be cut with another cutting tool, such as tool 81.

It should be noted that the prerequisite for equal wearing of the various cutting tools is that each tool cut an equal distance of lineal surface. However, since the tools are of equal width, equal lineal surface is synonomous with equal surface area.

While there has been only one embodiment of this invention illustrated and described, it will be obvious to the artisan that other embodiments are possible without departing from the scope and intent of the invention which is limited only by the appended claim.

Having thus described the invention, what is claimed and is desired to be secured by Letters Patent of the United States is:

A cutting tool assembly comprising a tool holder having a central axis, a plurality of cutting tools secured in and extending radially from said tool holder with their cutting end portions terminating at radially equal distances from said axis, one of said tools being an index cutting tool extending from said tool holder, a second one of said cutting tools extending radially from said tool holder at a radial angle of 51° with said index tool, a third one of said cutting tools extending at a radial angle of 93° with said index tool, a fourth one of said cutting tools extending at a radial angle of 126° with said index tool, and a fifth one of said cutting tools extending at a radial angle of 154° with said index tool, said tools being operable upon rotation of said tool holder about its central axis to cut equal surface areas of a rotating annular channel surface.

(References on following page)

References Cited in the file of this patent

UNITED STATES PATENTS

| | | | |
|---|---|---|---|
| 84,697 | Joyce | Dec. 8, | 1868 |
| 440,319 | Mackintosh | Nov. 11, | 1890 |
| 475,939 | Haberlin | May 31, | 1892 |
| 707,472 | Welter | Aug. 19, | 1902 |
| 945,901 | Anthony | Jan. 11, | 1910 |
| 1,381,550 | Harkins | June 14, | 1921 |
| 1,492,103 | Parkes | Apr. 29, | 1924 |
| 1,710,462 | Uhrig | Apr. 23, | 1929 |
| 2,250,161 | Johnson | July 22, | 1941 |
| 2,540,323 | Cross | Feb. 6, | 1951 |